United States Patent Office 3,458,066
Patented July 29, 1969

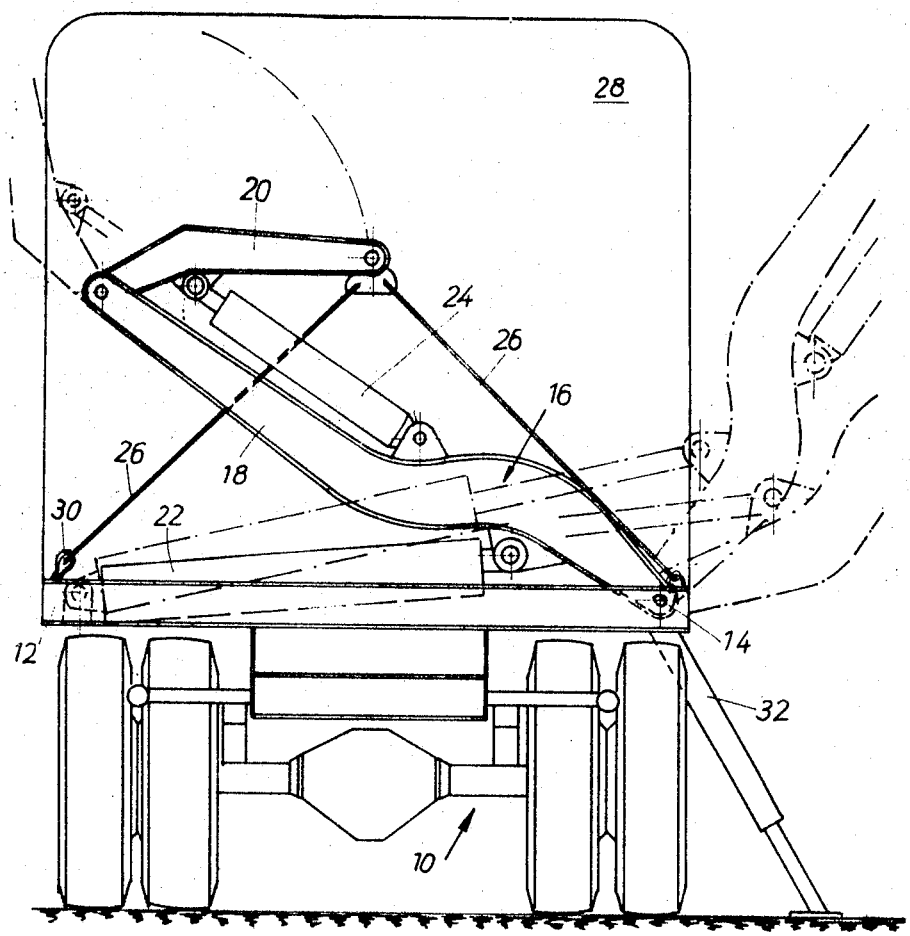

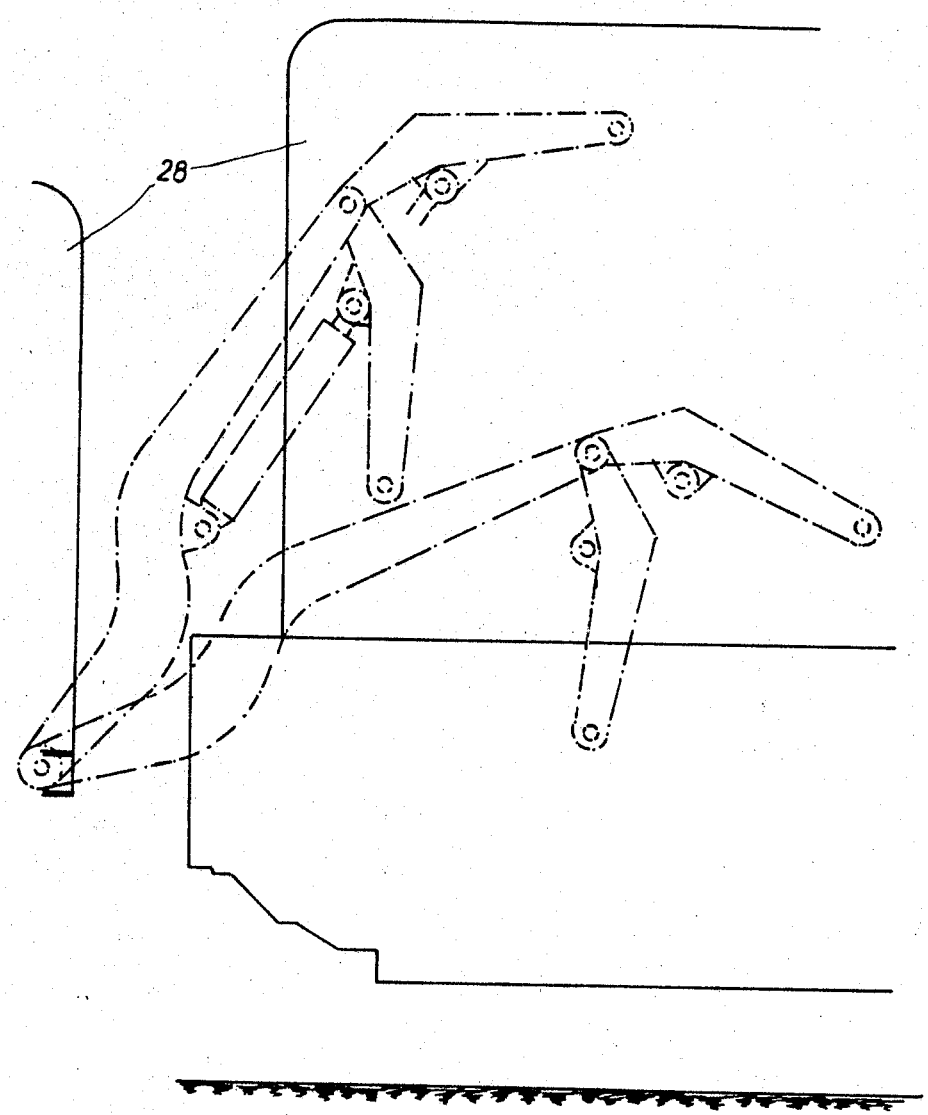

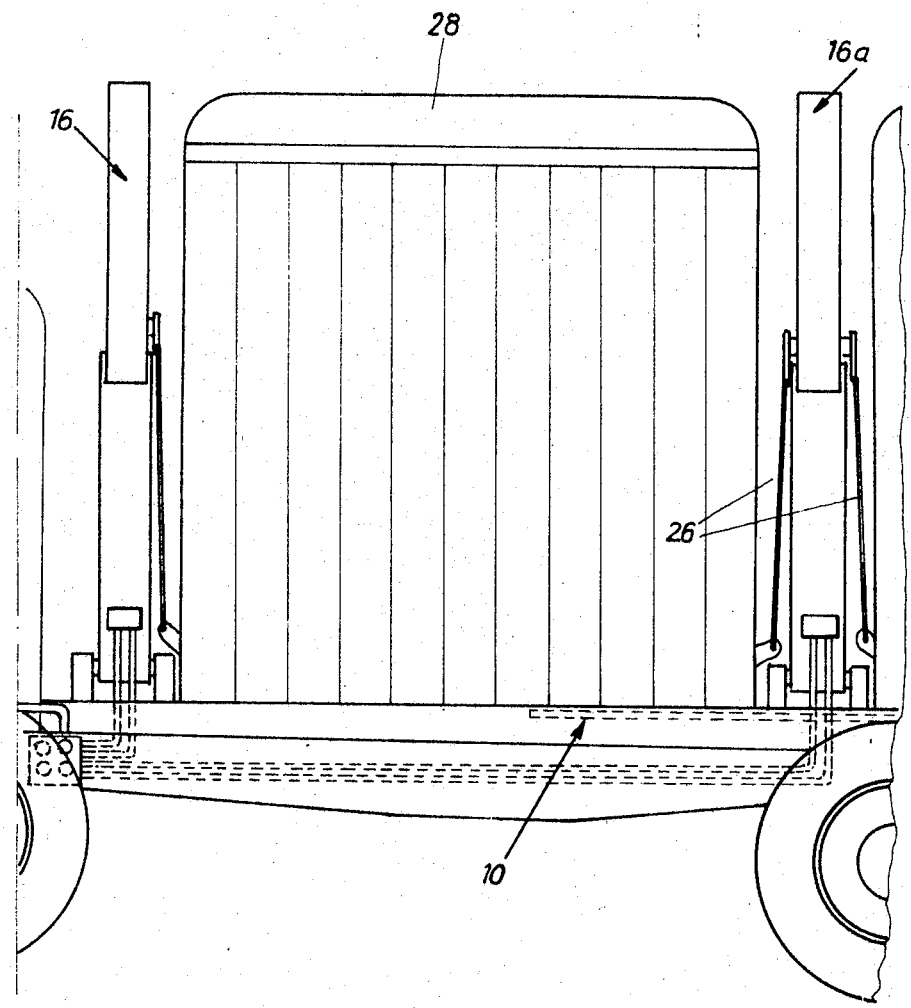

3,458,066
TRANSPORT VEHICLE
Kaspar Klaus, 46 Schlachthofstrasse,
Memmingen, Germany
Filed Aug. 4, 1966, Ser. No. 570,259
Claims priority, application Germany, Aug. 20, 1965,
K 56,934
Int. Cl. B60p 1/48; B66c 23/36
U.S. Cl. 214—77                             7 Claims

ABSTRACT OF THE DISCLOSURE

A vehicle having a loading means on its frame for the lateral loading and unloading of containers including at least two pivotable units with one unit arranged before and the other behind the container. Each unit includes a main rocker pivoted to the vehicle and a lift rocker pivoted to the main rocker with the pivotal axes thereof extending parallel with the vehicle's longitudinal axis. Props on the external pivoting side of the pivotable units support the frame on the ground and hydraulic piston-cylinder units pivot the rockers. A valve control is provided for ensuring synchronization of the rockers.

---

The present invention relates to a transport vehicle provided with a pressure-means operated tilting device fastened to its frame for loading and unloading objects.

In such a known transport vehicle, the tilting device consists of two rocker arms carried in a rotatable manner around a rear transverse axle and capable of being swung outwardly by means of pressure fluid cylinders. Loads, as containers or the like, can thus be loaded without making use of separate lifting appliances. Thus the container stands directly behind the vehicle and is lifted from behind onto the loading surface.

The applicability of the known transport vehicle is limited.

It is the object of the invention to improve the known transport vehicle and is provided with a different tilting device which makes possible an adaptation to different container sizes and allows a universal applicability.

This problem is solved, according to the invention, by at least one front and one rear main rocker arm carried in such a manner that such arms may be swung around a longitudinal axle of the vehicle frame and on which one pressure fluid operated lifting arms is articulated, whereby the lifting arms hold, by means of connection elements, the load particularly containers arranged therebetween, in order to load or unload the containers laterally. According to a particularly advantageous feature of the invention, the main arms are articulated near one longitudinal side of the vehicle frame.

As compared with the known transport vehicle, the containers are not unloaded towards the back but laterally thereby resulting in considerable advantages. As the containers are less width than length, the distances of movement are smaller in the present transport vehicle. The tilting device may thus be arranged in a lighter manner and the power necessary for its operation is less so that drives of a smaller size become possible. Contrary to the known transport vehicle, it is possible with the present invention to transship loads directly between the vehicle and loading ramps or railway trucks.

The main rocker arm is operable according to a further embodiment of the invention by a pressure fluid piston-cylinder arrangement, with the other end thereof being carried in an articulated manner on the longitudinal side of the vehicle frame opposite to the side where the main rocker arm is carried. Thus, an optimum use of the width of the vehicle is obtained with favorable statical and dynamical conditions for operation.

A further feature of the invention is that the main rocker arm is of substantially S-shaped configuration in its plane of movement which makes possible a movement of the vehicle particularly near to the ramps and results in the advantage of the particularly simple and efficient carrying of the pressure fluid cylinder. The carrying of the pressure-fluid piston-cylinder arrangements for the main rocker arm and the lifting rocker arm are provided preferably in the concave section of the S-shaped main rocker arm and in their withdrawn state the arms occupy a minimum of space.

A further, very advantageous feature of the invention is that at least one of the two main rocker arms is shiftable in the longitudinal direction in order to adapt it to loads of different length. By means of the present transport device it is also possible to transport several containers one behind the other. In this case, there is provided according to a further development of the invention for two containers each one central tilting device with a main rocker arm and lifting arm, which can be connected in a detachable manner with the front container as well as with the rear container. The rear and possibly also the central tilting device or tilting devices, i.e., at least all of the tilting devices with the exception of the foremost are preferably arranged in such a manner that they can be shifted in a longitudinal direction. In this manner the single tilting device can be adjusted corresponding to the different length of the containers to be transported. Thus, shorter and longer containers may be loaded easily without any difficult alterations being necessary. It is essential that an optimum use be made of the loading surface of the vehicle. If, e.g., a small space is left after loading, a correspondingly short container may be loaded in the most simple manner possible as, so to speak, a filling element.

A further development of the invention is that the connection links between the tilting device and the container or load respectively consists of chains or ropes which is particularly efficacious since a simple fastening is possible by adaptation to the different sizes of loads and types of fastening. The containers have preferably on their front surfaces fastening hooks to which the chains are attached. If a central tilting device is provided, and which serves for loading the front as well as the rear container, the connection members (chains or ropes) of the rear container are unhooked if the front container is to be unloaded or loaded and vice-versa.

A particularly suitable configuration is that at least one of the tilting devices can be removed completely from the vehicle frame and the frontmost tilting device remains preferably fixed. All of the other tilting devices can be removed from the vehicle frame as they are arranged in any case in a longitudinally shiftable manner according to the further embodiment of the invention. Thus, the vehicle may be used as a normal truck.

If the tilting device moves out laterally with its load, the frame of the vehicle will, of course, bend down laterally corresponding to the unsymmetrical load. In order to avoid this, there are arranged, according to a further embodiment of the invention, supports on the vehicle frame, which prop the frame against the ground when the tilting device is swung outwardly laterally. These supports are preferably arranged on that longitudinal side of the vehicle on which the tilting axle of the tilting device is arranged. The supports can preferably be operated by pressure means in such a way that they can be brought in position automatically before or at least during the tilting outwardly of the tilting devices. A suitable feature of the invention is that these supports are constructed in a telescoping manner. According to the invention, a pressure-fluid valve-arrangement is provided which feeds pressure fluid to the support before or at the beginning of the outwardly tilting movement of the tilting device. Hence, it is assured that the frame is supported when the tilting device becomes operative.

Preferably, a valve-control is provided which assures a synchronism of, in each case, one pair of the main rocker arms or lifting arms, respectively.

Furthermore, a particularly favorable feature of the invention is that an extensible outrigger is provided on the frame on which the outwardly swung container may be fastened laterally in order to tilt it downwardly by operating the tilting device. The container can be fastened preferably on the extensible outrigger by means of pins which can be fastened on one or the other longitudinal edge of the container in order to tilt the container downwardly selectively toward both sides.

In practice it has been proved to be sufficient to swing the lifting arm, which can be controlled independently of the main rocker arm in comparison with the latter within a range of about 150°.

With the present tilting device it is possible to unload on ramps or to load into railway trucks, transport containers of different size. It is also possible to load ramps which are at a considerable higher level than the loading surface of the transport vehicle. In addition, a tilting downwardly of the containers is possible in the most simple manner and the present transport vehicle may be universally used. It may, e.g. also be used as a towing or recovery truck.

Incorrectly parked passenger cars or broken-down motor vehicles can be loaded in a very simple manner. The transport vehicle is moved laterally besides the car to be loaded and a lifting platform is brought under the part to be loaded which is coupled with the connecting members (chains or ropes) of the tilting devices. In this field of application particular advantages are reached in so far as the single type of passenger cars are of a different length so that the loading surface of the transport vehicle according to the invention is exploited to an optimum degree.

Further objects and advantages of the invention will become more readily apparent from the following description and annexed drawings of one embodiment of the invention and in which drawings:

FIG. 1 is a diagrammatic front view of the transport vehicle provided with the tilting device according to the invention, FIG. 2 is a front view showing the unloading of a container from the vehicle according to FIG. 1 to a ramp which is arranged in parallelism to the side of the vehicle, and FIG. 3 is a side view of the vehicle.

A transport vehicle 10 has a frame 12 on the right longitudinal side of which a tilting device denoted generally at 16 is articulated at 14. The device consists of a main rocker arm 18 and a lifting arm 20 articulated to the free end thereof. The main rocker arm 18 is displaced by a pressure fluid operated piston-cylinder arrangement 22 from the neutral or transport position shown in full lines into the different outwardly tilted positions shown in dash- and dot-lines. The lifting rocker arm 20 is swung by means of another pressure fluid operated piston cylinder unit 24 operable between the lifting rocker arm 20 and the main rocker arm 18. In FIGURE 1 the lifting rocker arm 20 is in its neutral or transport position and may be swung outwardly by extending the piston of the pressure fluid cylinder 24 by about 150° in the position shown in dash- and dot-lines.

The main rocker arm has, according to the invention, a bent shape. For simplicity, the form is designed as being substantially S-shaped, in spite of the fact that the upper arm 18 thereof is about straight. The S-shaped configuration makes possible the particularly space-saving arrangement of the hydraulic cylinders 22 and 24. In addition, the S-shaped configuration makes possible the movement of the vehicle 10 very close to a ramp as is shown e.g. by the upper dash- and dot-line position of the main rocker arm in FIGURE 1, in which the middle section between the two opposite curves of the S-shape is in a substantially vertical position.

At the end of the lifting rocker arm 20 there are fastened pulling means 26 such as chains or ropes which are attached to an object such as a container 28 to be lifted. Such objects or containers are provided preferably on their front surfaces with fastening means such as hooks 30 to which the chains 26 may be attached.

On the vehicle frame 12 are arranged at a longitudinal distance from each other supports 32 attached laterally on the frame. These supports are at the side of the vehicle on which the tilting device 16 is articulated. The supports 32 prevent a modification of the position of the vehicle frame 12 taking place while the tilting device 16 is swung outwardly. The supports 32 are preferably pressure-fluid operated whereby an extending of the support 32 is reached before the tilting device 16 comes into operation or at least before it causes an eccentric load of the vehicle.

In FIGURE 3 an embodiment of the transport vehicle of the present invention is shown, in which the loading surface is capable of receiving at least two containers. Correspondingly, three tilting devices 16 are necessary and the front tilting device 16 and the central tilting device 16a are shown. The central tilting device 16a cooperates alternatively with the front or the rear tilting device. It is, of course, possible to operate all of the tilting devices simultaneously so that two or more containers may be unloaded or loaded simultaneously. Generally, however, the loading and unloading takes place for one container after the other. If the container 28 is to be unloaded from the vehicle 10, the chains or ropes 26 associated with the rear container are unhooked. Thereafter, the tilting devices 16 and 16a are operated, and the synchronism thereof is guaranteed by a pressure-fluid quantity regulator. After the tilting back, the chains 26 shown at the right of FIGURE 3 are fixed on the rear container, whereafter after which the containers may be swung outwardly by means of the central tilting device 16a and the rear tilting device (not shown).

Preferably all of the tilting devices but at least the rear ones with the exception of the foremost tilting device 16 are longitudinally shiftable and may be removable. The guide rails for this purpose are not shown in the drawings but the arrangement is self-evident to any specialist in the art. In the drawings the tilting device for the containers 28 is likewise not shown in detail. It consists e.g. of a laterally extensible outrigger which can be connected selectively with one of the two lateral edges of the outwardly swung transport containers 28 by means of pins. If the lifting rocker arm 20 and the main rocker arm 18 are moved, there remains for the movement of the container 28 only a degree of liberty, as its one longitudinal edge remains stationary. The container 28 can thus tilt only around the stationary longitudinal edge and, depending on the longitudinal edge which has been fixed toward one or the other side so that a two-sided tilting becomes possible.

This invention is not to be confined to any strict conformity to the showings in the drawings but changes or modifications may be made therein so long as such changes or modifications mark no material departure from the spirit and scope of the appended claims.

I claim:

1. A transport vehicle having a frame provided with a loading device for the lateral loading and unloading of a load particularly a container, said loading device including at least two pivotable units, with one unit being arranged before and the other unit behind the load, each pivotable unit being provided with a main rocker pivotally mounted on the vehicle frame and a lift rocker pivotably mounted on the main rocker, the pivotal axes of the main and lift rockers extending parallel with the longitudinal axis of the vehicle, hydraulic piston-cylinder units operably related to the frame and main rocker and lift rocker, respectively for pivoting the main and lift rockers, a valve control for the hydraulic piston-cylinder units for ensuring synchronization of both main rockers and both lift rockers of the loading device, each main rocker being of S-shape in its plane of movement, and bearings for the cylinder-piston units for the main rocker and lifting rocker being provided in the concave section of the S-shaped main rocker.

2. Transport vehicle according to claim 1 wherein the main rockers are articulated adjacent one longitudinal side of the vehicle frame.

3. A transport vehicle having a frame provided with a loading device for the lateral loading and unloading of a load particularly a container, said loading device including at least two pivotable units with one unit being arranged before and the other unit behind the load, at least one of the pivotable units being longitudinally displaceable in the direction of the longitudinal axis of the vehicle, said at least two pivotable units being mechanically independent of each other, and a separate drive for each pivotable unit operably related to said unit.

4. Transport vehicle according to claim 1 for transporting several containers arranged one behind the other wherein for each two containers one central pivotable unit with main and lifting rockers is provided for being releasably connected with the rear container as well as the front container.

5. Transport vehicle according to claim 3, wherein at least the rear pivotable unit is arranged in a longitudinally shiftable manner.

6. Transport vehicle according to claim 5, wherein at least one of the pivotable units may be removed from the vehicle frame.

7. Transport vehicle according to claim 3 in which props are mounted on the side of the vehicle frame for supporting the frame on the ground.

References Cited

UNITED STATES PATENTS

| | | | |
|---|---|---|---|
| 2,971,661 | 2/1961 | Isaacs | 214—80 |
| 3,174,630 | 3/1965 | Tantlinger et al. | |

FOREIGN PATENTS 899,484   6/1962   Great Britain.

OTHER REFERENCES

German printed application, Genkinger, 1,073,956, Jan. 21, 1960.

ROBERT G. SHERIDAN, Primary Examiner

U.S. Cl. X.R.

212—8